June 1, 1943. W. P. PETERSON 2,320,446
LIGHT
Filed May 12, 1941 2 Sheets-Sheet 2
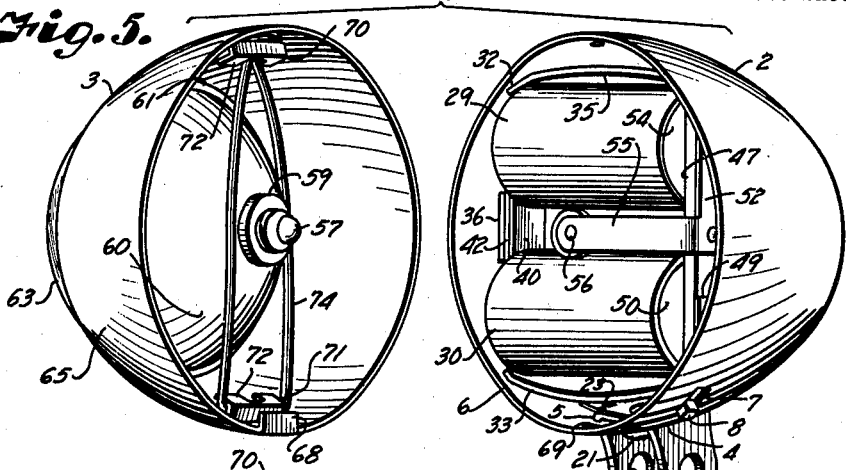
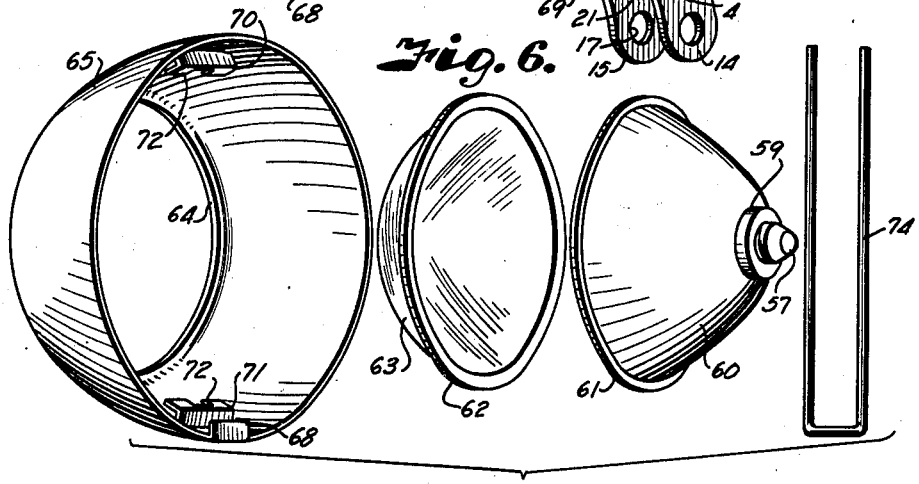
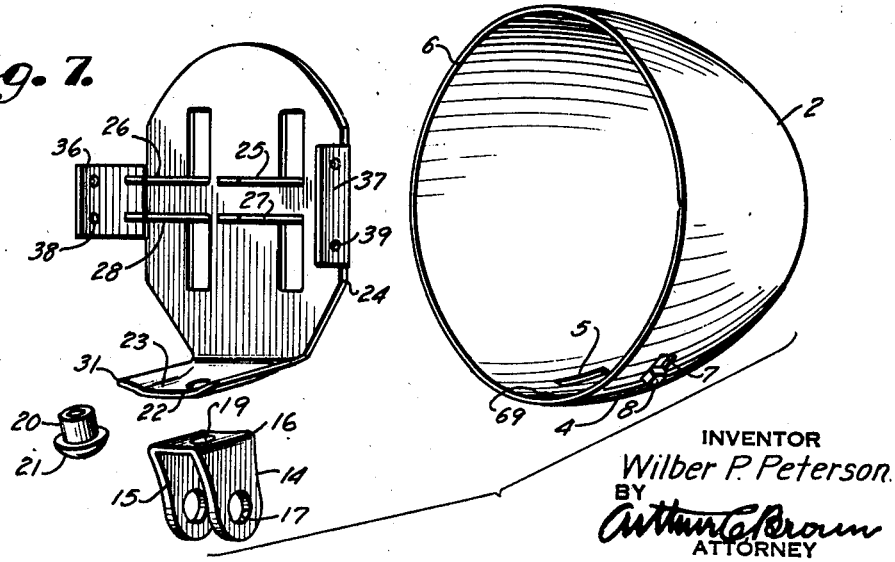
INVENTOR
Wilber P. Peterson.
BY
Arthur T. Brown
ATTORNEY

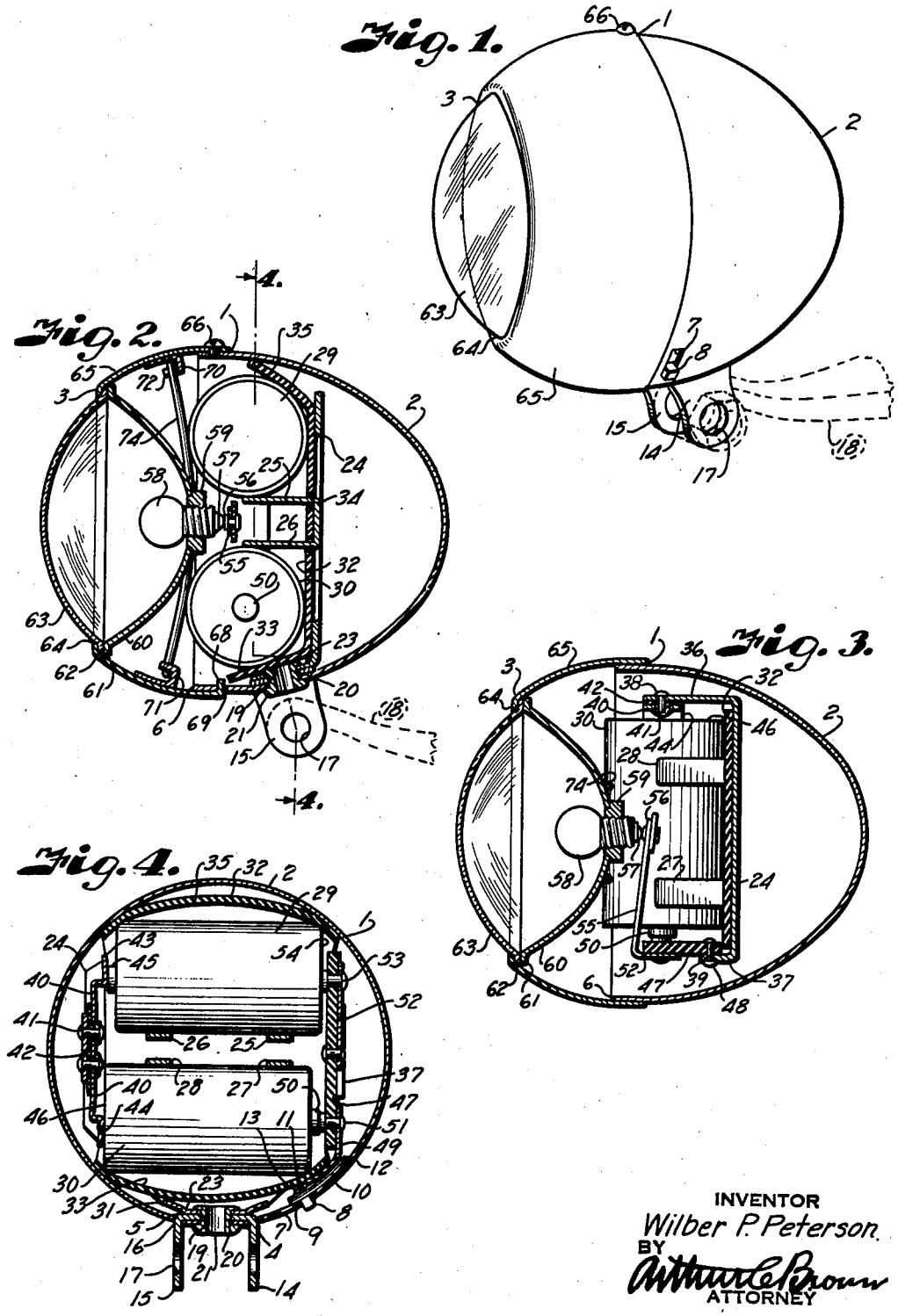

Patented June 1, 1943

2,320,446

UNITED STATES PATENT OFFICE 2,320,446

LIGHT

Wilber P. Peterson, Kansas City, Mo.

Application May 12, 1941, Serial No. 393,009

4 Claims. (Cl. 240—7.55)

This invention relates to lights and more particularly to self-contained lights, the principal object of the invention being to provide a convenient, economical and efficient light of this character.

Other objects of the invention are to so arrange a light and the elements thereof in a housing as to provide an extremely simple and compact arrangement; to eliminate conventional wiring; to provide for locking a lens and reflector in a bezel and/or relative to batteries in a shell or frame in a simple and effective manner; to provide a spring lock for engaging the reflector of the light and the batteries for holding each securely in place in the shell; to provide for holding a battery mounting and separating frame assembly in a shell portion of the light in a convenient, simple and effective manner; to provide a bracket having portions passing through the shell of the light for preventing turning of the shell on the bracket; to provide the elements of a light wherein the bracket, frame and shell are rigidly connected in one operation; to provide for employing standard sizes of batteries and arranging the same for suitable mounting in the light frame; to simplify interconnection of the elements of the light and to maintain alignment of the light and facilitate focusing thereof by such interconnecting arrangement thereof; and to provide improved elements and arrangements thereof in a light of the character and for the purposes noted.

In accomplishing these and other objects of the present invention, I have provided improved details of structure, the preferred form of which is illustrated in the accompanying drawings wherein:

Fig. 1 is a perspective view of a light embodying the features of the present invention.

Fig. 2 is a longitudinal vertical cross-sectional view through the light illustrated in Fig. 1.

Fig. 3 is a longitudinal horizontal sectional view through the light illustrated in Fig. 1.

Fig. 4 is a vertical transverse sectional view through the light illustrated in Fig. 1 substantially on the line 4—4, Fig. 2.

Fig. 5 is a detail perspective view of my improved light, the bezel and shell sections being shown in disassembled spaced relation.

Fig. 6 is a detail perspective view of the bezel section of the light, parts thereof being shown in spaced, disassembled relation.

Fig. 7 is a detail perspective view of the shell section of my improved light, the battery mounting bracket being shown in disassembled relation to the shell.

Referring more in detail to the drawings:

1 designates a light embodying the features of the present invention which preferably includes a shell section 2 and a bezel section 3.

The shell section is preferably of hollow metallic structure generally simulative of approximately one-half of an egg shell and having spaced longitudinally arranged slots 4 and 5 in a portion thereof, preferably adjacent the periphery 6 of the shell section.

An additional transversely arranged slot 7 is provided in the shell section 2 which forms a guide for a lug 8 projecting therethrough from a switch element 9 arranged within the shell section and preferably comprising a metallic shoe 10 separated from a metallic contact 11 by an insulating strip 12. The lug, shoe, strip and contact are preferably held together by a rivet or the like 13 in such a manner as to act as a sliding unit upon manipulation of the lug 8.

Mounted in the slots 4 and 5 of the shell section are ears 14 and 15 of a bracket body member 16, which latter is mounted interiorly of the shell section in such a manner that the ears thereof extend outwardly relative to the shell exteriorly thereof. The ears 14 and 15 are provided with suitable apertures 17 for mounting the bracket shell section of the light housing on a suitable support diagrammatically indicated at 18 in Fig. 1. The bracket body member 16 is also provided with an aperture 19 for passing the shank 20 of a rivet or the like 21, said shank being arranged to pass through an aperture 22 in a horizontally arranged flange 23 of a battery assembly frame 24 and to be flattened in secured relation thereto for holding the frame and shell together, maintaining the alignment of the light with its support and thus facilitating focusing of the light. The bounding edges of the slots in the shell are preferably parallel and engage the sides of the ears 14 and 15 holding the bracket rigidly in the shell and preventing said shell from turning on the bracket.

The frame 24 is preferably of a size and shape arranged for fitting within the shell section 2 and has preferably vertically spaced aligned outwardly struck arms 25, 26, 27 and 28 that collectively form separators for batteries 29 and 30. The batteries, due to the present arrangement, may be and preferably are, conventional flash light batteries. As is apparent, it is possible for the batteries to be arranged transversely of the shell either vertically or horizontally. The batteries seat between the inner surface of the shell and said separators.

The flange 23 of the frame 24 is preferably provided with upwardly flared side portions 31 that tend to fit and arrange an insulating sheet 32 and particularly the lower outwardly laterally turned flange 33 thereof in supporting relation to the battery 30. The insulation sheet has aperteres 34 for passing the same over the separators 25 to 28 and is also provided with an upper outwardly laterally turned flange 35 for retainingly and insulatingly engaging the upper battery 29. The end edges of the insulating sheet 32 are arranged between outwardly laterally turned battery contact brackets 36 and 37 that are provided with suitable fastening device apertures 38 and 39 respectively.

The bracket 36 is preferably of greater length than the bracket 37 and has a preferably brass terminal 40 secured at its outer end to the bracket, as by fastening devices 41, an insulating separator 42 being provided between the bracket and terminal. The ends of the terminal 40 are provided with feet 43 and 44 that engage opposite terminal ends 45 and 46 of the batteries 29 and 30 respectively. The bracket 37 has an insulating strip 47 secured thereto, as by suitable fastening devices 48, and the strip 47 supports a preferably brass contact 49 that is engageable with the contact 11 of the switch 9, as and when the switch is manipulated, and which is, further, engageable with the terminal end 50 of the battery 30 by a current conducting fastening device 51 that secures the terminal 49 to the strip 47.

Another preferably brass contact 52 is secured to the strip 47 by a current conducting fastening device 53 that contacts the terminal end 54 of the battery 29. The contact 52 comprises an arm 55 extending substantially between the batteries longitudinally thereof to a centrally arranged point relative to the periphery of the shell section of the light.

The inner end of the contact arm 55 is provided with a contact 56 arranged for engagement by the current conducting base 57 of a light bulb 58 that is threadedly mounted in a socket 59 of a reflector 60 of suitably curved conformation.

The present arrangement thus eliminates conventional wiring between batteries, contacts, light bulb and switch.

The periphery 61 of the reflector is arranged for engagement with the periphery 62 of a suitable lens 63, the periphery of the lens being engageable with a retaining flange 64 at the outer periphery of the bezel section 65. The bezel section is adapted for sleeved engagement, preferably externally, with the shell section 2, both shell and bezel sections having aligned openings for receiving a fastening device 66 to retain the same in interengaged relation after a centering ear 68 on the bezel section, for example, has been passed through a corresponding slot 69 in the shell section, whereby the sections may be aligned and the fastening device applied to the apertures provided therefor to effect the noted interengagement of the sections.

A particularly important feature of the present invention is an arrangement for holding the batteries in place in the shell section of the light, which arrangement also provides for locking the lens and reflector in the bezel section of the light. This arrangement is clearly illustrated in Figures 5 and 6, wherein preferably substantially duplicate clips 70 and 71 having inwardly directed yoke arms 72, relative to the bezel, are oppositely disposed and suitably secured on the inner face of the bezel in such a manner that opposite ends of a spring substantially U-shaped wire 74 may be bent forwardly to partially follow the contour of the rear face of the reflector and thus be made engageable between the clip arms and the bezel for holding the ends of the spring in desired position in tensioned engagement with the reflector to the end that the reflector is forced outwardly to also force the lens outwardly into securing engagement with the outer retaining flange of the bezel.

Due to the horizontal arrangement of the batteries 29 and 30, the spring 74 also holds the batteries in place, as particularly shown in Fig. 2, and thus acts as a lock not only for the reflector and lamp, but also to maintain the batteries in operative position relative to the contact provided therefor and the light bulb, whereby the light generally is rendered operative.

The operation of a light constructed and assembled as described is as follows:

The light may be mounted on a suitable support, such as bicycle handle bars, motorcycle tail light supports and/or other auxiliary light supports as indicated for example in Fig. 1. When it is desired to energize the light, the lug 8 of the switch is moved upwardly, as in Fig. 7, whereupon energy in the batteries is transferred to the light bulb to energize the same and operate the light.

It is apparent therefore that a light has been provided by the present invention that is of self-contained character, compact in external and internal design, economical in manufacture, convenient in assembly and efficient in operation.

What I claim and desire to secure by Letters Patent is:

1. In a light of the character described, interconnected shell and bezel sections, batteries in said shell section, contacts for said batteries, a light bulb in said bezel section engageable with said contacts, a switch for energizing said bulb, a reflector supporting said bulb, a lens in the bezel section of the light engaged by said reflector, shoulders on the bezel section spaced from the reflector, means engaging the shoulders and having portions engaging the reflector for locking the reflector and lens in interengageable relation with the bezel section to form a complete unit bezel structure of the light, said locking means also engaging the batteries in the shell section of the light and holding the same in operative position when the bezel section is mounted thereon, and means for securing said bezel section on the shell section.

2. In a light of the character described, a shell having batteries, a light bulb operatively engageable with the batteries, a reflector, and a lens arranged therein, and means for locking the reflector and lens in desired relation to said shell comprising a pair of oppositely disposed clip members secured to said shell, and a spring element having opposite ends removably engageable with said clips and having intermediate portions arranged to engage the reflector under tension, said spring being engageable with said batteries to hold the same in desired position relative to said shell.

3. In a light of the character described, a shell, batteries, means supporting the batteries in the shell comprising a bracket secured to said shell and having spaced members on the bracket forming separators for said batteries, a contact for said batteries, a bezel section, a reflector and a lens arranged in the bezel section, a light bulb in the reflector, means for locking the reflector and lens in desired relation to the bezel section comprising a spring element having opposite ends removably engageable with the bezel section and having intermediate portions arranged to engage the reflector under tension, and means for securing the bezel section on the shell to effect engagement between the spring element and the batteries to hold same in the desired position on the bracket and to effect engagement between the light bulb and the battery contact.

4. A structure as specified in claim 3 in combination with a light supporting bracket, and means for rigidly securing the battery supporting bracket, light supporting bracket and shell in interengaged condition.

WILBER P. PETERSON.